(12) United States Patent
Yano et al.

(10) Patent No.: US 9,086,828 B2
(45) Date of Patent: Jul. 21, 2015

(54) PRINT MANAGEMENT DEVICE AND PRINT MANAGEMENT PROGRAM

(71) Applicants: DAI NIPPON PRINTING CO., LTD., Tokyo-to (JP); COMPUTER ENGINEERING & CONSULTING, LTD., Zama-shi, Kanagawa-ken (JP)

(72) Inventors: Yoshihiro Yano, Tokyo-to (JP); Fukio Handa, Tokyo-to (JP); Tadashi Fujita, Tokyo-to (JP); Shigeo Hachiki, Tokyo-to (JP)

(73) Assignees: DAI NIPPON PRINTING CO., LTD., Tokyo (JP); COMPUTER ENGINEERING & CONSULTING, LTD., Zama-shi, Kanagawa (JP)

( * ) Notice: Subject to any disclaimer, the term of this patent is extended or adjusted under 35 U.S.C. 154(b) by 0 days.

(21) Appl. No.: 14/387,402

(22) PCT Filed: Mar. 22, 2013

(86) PCT No.: PCT/JP2013/058302
§ 371 (c)(1),
(2) Date: Sep. 23, 2014

(87) PCT Pub. No.: WO2013/141361
PCT Pub. Date: Sep. 26, 2013

(65) Prior Publication Data
US 2015/0062623 A1 Mar. 5, 2015

(30) Foreign Application Priority Data

Mar. 23, 2012 (JP) .................................. 2012-066622

(51) Int. Cl.
| | |
|---|---|
| *G06F 3/12* | (2006.01) |
| *G06K 15/00* | (2006.01) |
| *G06K 15/02* | (2006.01) |
| *H04N 1/32* | (2006.01) |

(52) U.S. Cl.
CPC ............ *G06F 3/1213* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS

2001/0038462 A1* 11/2001 Teeuwen et al. ............. 358/1.15
2006/0279761 A1* 12/2006 Wang et al. .................. 358/1.14
(Continued)

FOREIGN PATENT DOCUMENTS

| JP | 07-261955 A | 10/1995 |
|---|---|---|
| JP | 11-095940 A | 4/1999 |
| JP | 2004-348401 A | 12/2004 |
| JP | 2011-188970 A | 9/2011 |

OTHER PUBLICATIONS

International Search Report dated May 29, 2013; PCT/JP2013/058302.

*Primary Examiner* — Miya J Cato
(74) *Attorney, Agent, or Firm* — Ladas & Parry LLP

(57) ABSTRACT

When the user executes printing in a system to which plural printers are connected, the waiting time of each user is minimized, and the use of the plural printers is equalized. The print management device is connected to the terminal devices and the printers via a network, for example. The print management device saves the print jobs transmitted from each of the terminal devices. When receiving the print instruction from any one of the printers, the print management device transmits the print job corresponding thereto to the printer and makes the printer execute the printing. Also, the print management device collects and manages the print execution status of the printers. When receiving a new print instruction from the printer which is already executing the print job, the print management device calculates the waiting time of each of the printers and notifies the printer having the shortest waiting time.

10 Claims, 5 Drawing Sheets

(52) U.S. Cl.
CPC ............ *G06F3/1261* (2013.01); *G06F 3/1267* (2013.01); *G06F 3/1288* (2013.01); *G06F 3/1291* (2013.01); *G06K 15/402* (2013.01); *G06K 15/02* (2013.01); *H04N 1/32502* (2013.01); *H04N 1/32523* (2013.01); *H04N 1/32662* (2013.01); *H04N 2201/3205* (2013.01); *H04N 2201/3222* (2013.01)

(56) References Cited

U.S. PATENT DOCUMENTS

| 2010/0231957 | A1* | 9/2010 | Park et al. | 358/1.15 |
| 2010/0238484 | A1* | 9/2010 | Komine | 358/1.15 |
| 2012/0086978 | A1* | 4/2012 | Uchikawa | 358/1.15 |
| 2012/0203882 | A1* | 8/2012 | Ohashi | 709/223 |

* cited by examiner

FIG. 3A (SAVED JOB INFORMATION)

| USER ID | JOB OWNER | DOCUMENT |
|---|---|---|
| 0014 | USER S | Xxx223.doc |
| 0425 | USER M | stt120.doc |
| 0101 | USER T | mmpp234.xls |
| . | . | . |
| . | . | . |

FIG. 3B (ONGOING JOB INFORMATION)

| PRINTER | JOB OWNER | DOCUMENT | TOTAL PRINTING TIME | REMAINING PRINTING TIME |
|---|---|---|---|---|
| PRINTER A | USER K | abc111.doc | 6min 30sec | 2min 50sec |
| PRINTER B | USER O | fff120.doc | 3min 40sec | 1min 40sec |
| PRINTER C | (UNOCCUPIED) | | | |

FIG. 3C (MOVEMENT TIME INFORMATION)

| PRINTER A⇔B | PRINTER A⇔C | PRINTER B⇔C |
|---|---|---|
| 1min 00sec | 2min 30sec | 3min 00sec |

(DISPLAY EXAMPLE OF PRINTER A)

(DISPLAY EXAMPLE OF PRINTER B)

PRINT MANAGEMENT DEVICE AND PRINT MANAGEMENT PROGRAM

TECHNICAL FIELD

The present invention relates to a technique for managing print jobs by a plurality of printers.

BACKGROUND TECHNIQUE

Recently, when a printer is used in an office or a school, it becomes a general practice to use an employee ID card or a student ID card as an authentication medium for the purpose of preventing left printed matter, improving security and enabling charges. Specifically, after transmitting a print job to a server from a PC, a user goes to a place of the printer to instruct the printing by putting the employee ID card to the printer. The printer which receives the print instruction obtains the print job data of the user from the server based on the user ID read from the employee ID card, and prints out the data.

However, in a situation where a plurality of printers are connected to a server, there is such a case that, when a user goes to the place of a nearest printer, the printer is executing printing for another user. In such a situation, it is difficult for the user to determine, in order to start his print job faster, whether he should wait for the finish of the print by that printer or he should move to the place of other printers to execute his print job there. Therefore, there are such disadvantages that the user's waiting time is wasted and the plurality of printers cannot be effectively used.

Patent Reference 1 discloses a system for transmitting print jobs from a plurality of information processing devices to an image forming device to execute the print jobs. The system calculates the time necessary for completing each of the print jobs included in the printing queue of the image forming device based on the printing time of each of the printing jobs, and notifies the time to the information processing devices.

Patent Reference 1: Japanese Patent Application Laid-Open under No. 2004-348401

DISCLOSURE OF INVENTION

Problem to be Solved by the Invention

It is a main object of the present invention to provide a print management device capable of minimizing waiting time of a user and equalizing the use of a plurality of printers, when printing is executed in a system connected to a plurality of printers.

Means for Solving the Problem

According to one aspect of the present invention, there is provided a print management device connected to a plurality of printers and a plurality of terminal devices, comprising: a print job saving unit which receives print jobs from the plurality of terminal devices and saves the print jobs; a print status management unit which manages print execution status of each of the plurality of printers; and a print control unit which obtains, when receiving a print instruction from one of the plurality of printers, the print job corresponding to the print instruction from the print job saving unit and transmits the print job to a sender printer which has transmitted the print instruction to make the sender printer execute the print job, wherein, when the sender printer is executing another print job, the print control unit calculates waiting time of the plurality of printers based on the print execution status of the plurality of printers and time necessary to move between the plurality of printers, and notifies the sender printer of the printer having a shortest waiting time.

The print management device described above is connected to the terminal devices and the printers via a network, for example. The print management device saves the print jobs transmitted from each of the terminal devices. When receiving the print instruction from any one of the printers, the print management device transmits the print job corresponding thereto to the printer and makes the printer execute the printing. Also, the print management device collects and manages the print execution status of the printers. When receiving a new print instruction from the printer which is already executing the print job, the print management device calculates the waiting time of each of the printers and notifies the printer having a shortest waiting time. Thereby, the user who tried to print by the printer which is already executing the printing can know which printer is fastest.

Specifically, when the sender printer is executing the other print job, the print control unit determines a faster method from a method of using the sender printer after waiting for a finish of the other print job and a method of using a recommended printer having a shortest waiting time among other printers after moving to the recommended printer, and notifies the sender printer of the faster method. Therefore, the user can easily determine whether he should wait for the finish of printing by the printer or he should move to the recommended printer to print.

In one mode of the print management device described above, when the print control unit determines that using the recommended printer is faster and a user instructs to use the recommended printer, the print control unit transmits the print job corresponding to the print instruction to the recommended printer to make the recommended printer execute the print job. In this mode, when the user agrees to use the recommended printer, the printing is immediately started by the recommended printer. Therefore, the user can reduce the printing time.

In another mode of the print management device described above, when the print control unit determines that using the recommended printer is faster and a user instructs to use the recommended printer, the print control unit sets the recommended printer to a reserved state and invalidates the print instruction by the users other than the user who has made the print instruction. Also, when the print control unit receives the print instruction transmitted from the recommended printer and made by the user who has made the print instruction, the print control unit releases the reserved state of the recommended printer and makes the recommended printer execute the print job corresponding to the print instruction.

In this mode, since the print instruction by other users are invalidated until the user goes to the recommended printer and instructs printing, the user can promptly execute his printing. In addition, if the user agrees to use the recommended printer, the printing is not started until the user goes to the recommended printer and instructs printing, thereby preventing the printed matter from being left on the printer.

In still another mode of the print management device described above, the print job includes processing choice information specifying which one of a first processing and a second processing is to be executed when the recommended printer is used, the first processing immediately transmitting the print job corresponding to the print instruction to the recommended printer to execute the print job, the second processing setting the recommended printer to a reserved state and invalidating the print instruction by the users other than the user who has made the print instruction. When the print control unit determines that using the recommended printer is faster and a user instructs to use the recommended printer, the print control unit executes one of the first processing and the second processing specified by the processing choice information. In this mode, in case of using the recommended printer, the user sets, for each of the print jobs, whether the print job is immediately executed by the recommended printer or the recommended printer is first set to the reserved state and the print job is executed after the print instruction is made to the recommended printer.

In still another mode of the print management device described above, the print control unit releases the reserved state of the recommended printer, if a predetermined time has passed after setting the recommended printer to the reserved state but the print control unit does not receive the print instruction from the recommended printer by the user who has made the print instruction. In this mode, if the user who has set the recommended printer to the reserved state does not actually make the print instruction to the recommended printer, the reserved state is automatically released after the predetermined time has passed. Therefore, it is possible to prevent such a situation that other users cannot use the recommended printer for an unnecessarily long time.

In a preferred example, the print job includes an identification information of the user who has transmitted the print job, the print instruction includes the identification information of the user who has transmitted the print instruction, and the print control unit obtains the corresponding print job from the print job saving unit based on the identification information of the user included in the received print instruction. Also, each of the plurality of printers includes: a reading unit which reads the identification information of the user from a storage medium possessed by the user; and a transmitting unit which transmits the identification information of the user read from the storage medium in a manner included in the print instruction.

According to another aspect of the present invention, there is provided a print management program executed by a print management device connected to a plurality of printers and a plurality of terminal devices and including a computer, the program making the computer function as: a print job saving unit which receives print jobs from the plurality of terminal devices and saves the print jobs; a print status management unit which manages print execution status of each of the plurality of printers; and a print control unit which obtains, when receiving a print instruction from one of the plurality of printers, the print job corresponding to the print instruction from the print job saving unit and transmits the print job to a sender printer which has transmitted the print instruction to make the sender printer execute the print job, wherein, when the sender printer is executing another print job, the print control unit calculates waiting time of the plurality of printers based on the print execution status of the plurality of printers and time necessary to move between the plurality of printers, and notifies the sender printer of the printer having a shortest waiting time. By executing this program by the computer of the print management device, the user who has tried to execute printing by the printer which is already executing printing can know which printer is fastest.

Effect of the Invention

According to the present invention, when the user executes printing in a system to which a plurality of printers are connected, the waiting time of each user can be minimized. In addition, the use of the plural printers can be equalized, and the printers of a limited number can be effectively used.

BRIEF DESCRIPTION OF THE DRAWINGS

FIGS. 3A to 3C shows examples of information owned by a print management server.

DETAILED DESCRIPTION OF THE PREFERRED EMBODIMENTS

Preferred embodiments of the present invention will be described below with reference to the attached drawings.

[Configuration]

Figure 1:
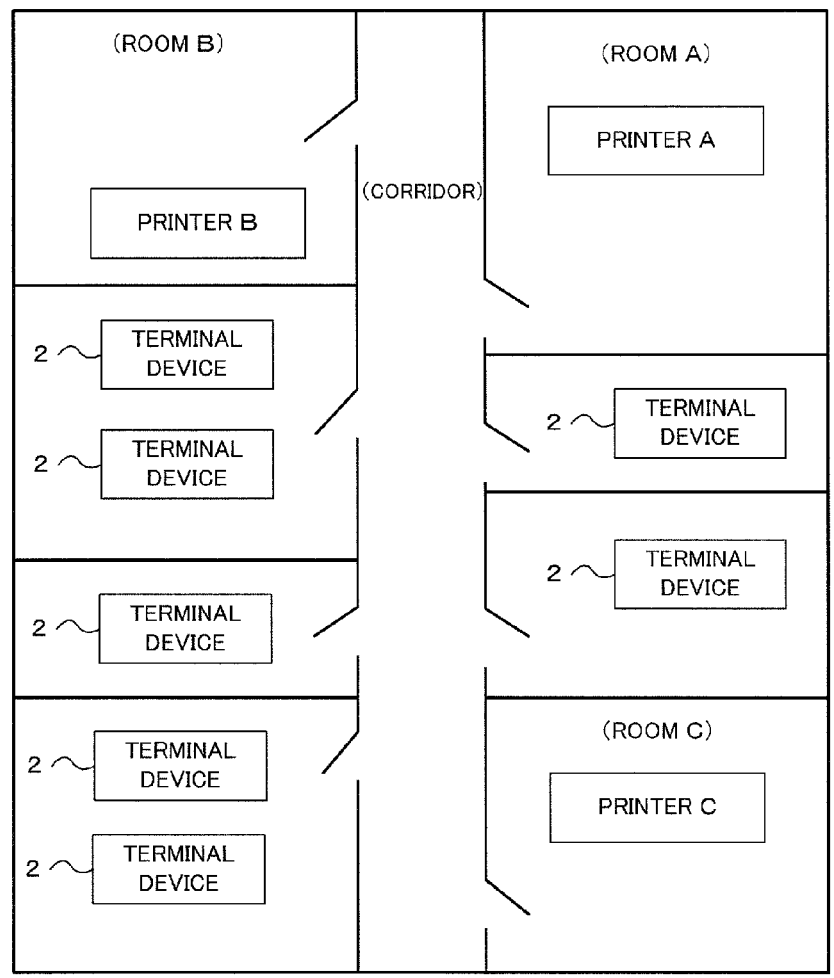
FIG. 1 is a plan view schematically illustrating a situation where printers are arranged.

FIG. 1 schematically illustrates a situation where printers are arranged in an embodiment of the present invention. As illustrated, a plurality of terminal devices 2 and a plurality of printers A to C are distributed in a plurality of room in an office. Specifically, three printers A to C are arranged in the rooms A to C, respectively, and the terminal devices 2 are arranged in other rooms. A user (e.g., an employee) works on the terminal device 2 of his own, and uses one of the three printers A to C when he needs to print out a document. Each user can use any one of three printers A to C. Namely, there is no restriction for the printer used by each user. In the following description, expression as "printer A" or "printer B" is used if a specific one of the three printers A to C is referred to, and expression as "printer" is simply used if a specific one is not referred to.

Figure 2:
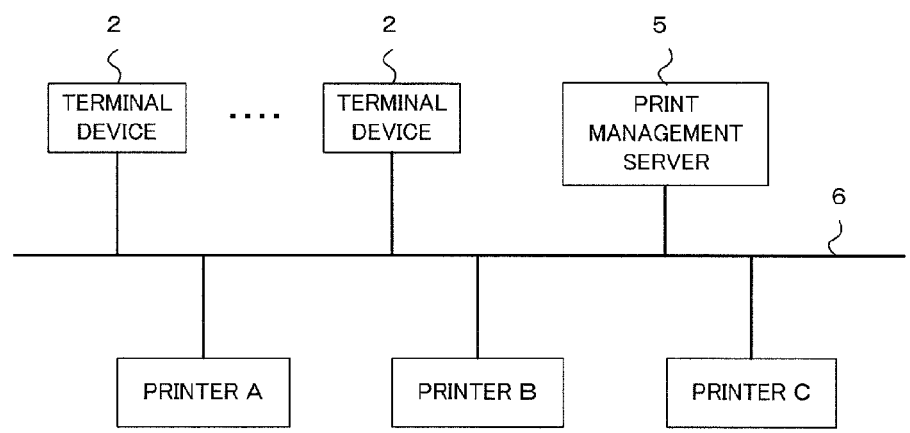
FIG. 2 is a block diagram illustrating a schematic configuration of a print management system.

FIG. 2 shows a schematic configuration of the print management system according to the embodiment. In the print management system, a plurality of terminal devices 2, a plurality of printers A to C and a print management server 5 are connected to a LAN 6, thereby configuring a network.

The terminal device 2 is a PC used by a user, for example. The user operates the terminal device 2 to do necessary works. Each user owns a storage medium which stores user ID of the user. In this embodiment, the storage medium is an IC card such as an employee ID card.

The printers A to C are arranged in the rooms A to C, respectively. The printers A to C may be various printers. For example, the printers A to C may be a dedicated printing machine or a so-called multifunction machine having a copying function and a facsimile function. Each of the printers A to C is provided with an IC card reader for reading out the user ID from the IC card of the user.

The print management server 5 totally manages and controls the print jobs transmitted from the plurality of terminal devices 2 to the printers A to C. It is noted that the print management server 5 functions as a print job saving unit, a print status management unit and a print control unit according to the present invention.

Next, description will be given of a basic method for the user to print a document. After instructing the printing from the terminal device 2, the user goes to the printer and puts the IC card to the printer to print out the document.

Specifically, the user operates the terminal device 2 to make a document. When printing the document becomes necessary, the user makes a print instruction by the terminal device 2. In response, the terminal device 2 receives the printing instruction and transmits the designated print job to the print management server 5. This print job includes the user ID indicating the maker of the document or the user who made the print instruction. The print management server 5 receives the print job from each of the terminal devices 2 and saves the print jobs.

Next, the user goes to the place of anyone of the printers, and puts his IC card to the printer. The printer reads out the user ID from the IC card, and transmits it to the print management server 5. The print management server 5 obtains the print job corresponding to the user ID from the saved plural print jobs, and transmits it to the printer. The printer executes the print job to print out the document. In this way, the user can print out the document.

As described above, the user makes the print instruction from the terminal device 2, and then go to the place of the nearby printer to put the IC card to the printer, thereby obtaining the printed document. However, there is a possibility that, when the user, goes to the place of the nearby printer, the printer is executing the print job of another user. In such a case, as a first method, the user can wait for the end of the print job of the other user there and then print his document by the printer. As a second method, the user can go to the place of another printer and print his document by that printer. However, the user normally cannot know which one of the first method and the second method is faster.

In this view, in this embodiment, if the printer is executing another print job when the user goes to the printer to put the IC card, the print management server 5 notifies the user of which one of the method (the first method) of waiting for the end of the printing to use the printer and the method (the second method) of going to the place of the other printer to use the other printer is faster. More specifically, the print management server 5 calculates the waiting time of the first method and the waiting time of the second method, and notifies the user of the method whose waiting time is shorter. This processing will be hereinafter referred to as "the waiting time comparison processing".

In order to execute the waiting time comparison processing, the print management server 5 stores saved job information, ongoing job information and movement time information. FIG. 3A shows an example of the saved job information. The "saved job information" is a list of the print jobs received from plural terminal devices 2. As shown in FIG. 3A, the saved job information includes a user ID, a job owner and a document.

The "user ID" is a user ID of the user who transmitted the print job. The "job owner" indicates the name of the user who made the print instruction of the transmitted print job. The "document" shows a file name of the document to be printed. It is noted that the print jobs transmitted from the terminal devices 2 to the print management server 5 are simply pooled in the print management server 5 and the printing order is not set according to the transmitted time or else. When the user puts the IC card to a certain printer to make a print instruction, the print job saved in the print management server 5 is transmitted to the printer and executed.

FIG. 3B shows an example of the ongoing job information. The "ongoing job information" indicates the print job being currently executed in each printer. As shown in FIG. 3B, the ongoing job information includes a job owner, a document, a total printing time and a remaining printing time for each of the printers A to C. The "job owner" and the "document" are the same as those in the saved job information. The ongoing job information may include the user ID instead of the job owner. In the example of FIG. 3B, the ongoing job information includes the information of only the print job being executed. However, if there is a print job reserved to be executed after the ongoing print job (hereinafter referred to "a reserved job"), the ongoing job information includes the reserved job.

The "total printing time" is a time necessary to complete the print job from its start, and the "remaining printing time" is a remaining time until the completion of the print job. The total printing time and the remaining printing time are calculated by the print management server 5. The print management server 5 has information of specification of each of the printers A to C, and knows the printing capacity and the printing speed. Therefore, the print management server 5 calculates the total printing time of one print job based on the data amount of the document to be printed by the print job and the printing speed of the printer. In addition, the print management server 5 subtracts the elapsed time from the start of the printing up to now from the total printing time to calculate the remaining printing time. Thus, the remaining printing time varies every moment.

FIG. 3C shows an example of the movement time information. The "Movement time information" indicates a standard time necessary for the user to move between the printers A to C, and is set to the time needed for the user to actually move between the printers A to C with a standard speed, for example.

[1st Embodiment]

Next, a first embodiment of the waiting time comparison processing will be described. Now, it is assumed that the ongoing job information and the movement time information are in the state as shown in FIGS. 3B and 3C, and that the user S puts the IC card to the printer A to make print instruction. In this case, the print management server 5 calculates the waiting time of each of the printers based on the remaining printing time of each of the printers in the ongoing job information and the movement time in the movement time information. The "waiting time" is the remaining printing time if the user uses the printer of the current position, and is the sum of the remaining printing time and the movement time to the other printer if the user moves to the other printer. As described above, there is a case where the ongoing job information includes the information of the reserved job. In such a case, the waiting time is calculated by further adding the total printing time of the reserved job.

Specifically, in the example of FIG. 3B, the remaining printing time of the printer A is 2 minutes 50 seconds. If the user S uses the printer A, the user S does not have to move (i.e., the movement time is zero), and therefore the waiting time of the printer A is "2 minutes 50 seconds".

The remaining printing time of the printer B is 1 minute 40 seconds, and the movement time from the printer A to the printer B is 1 minute. Therefore, the waiting time of the printer B (i.e., the waiting time in the case where the user S moves to the printer B and print by the printer B) is "2 minutes 40 seconds".

The printer C is not occupied and its remaining time is zero. The movement time from the printer A to the printer C is 2 minutes 30 seconds. Therefore, the waiting time of the printer C is "2 minutes 30 seconds".

Consequently, in this example, the waiting time of the printer C is shortest, and it is fastest for the user S to move to the printer C and print the document by the printer C. In this way, when the next print instruction is inputted during the execution of the printing job, each of the printers A to C transmits the user ID of the IC card to the print management server 5 to make inquiry. The print management server 5 calculates the waiting time of each of the printers A to C based on the ongoing job information and the movement time information as described above, determines the printer that has the shortest waiting time, and notifies it to the printer that transmitted the inquiry. The printer that transmitted the inquiry displays the contents of the notification on a display unit to notify it to the user. By going to any one of the printers and putting the IC card to the printer, the user can know the printer having shortest waiting time at that moment. Thus, the user can shorten the time until the start of the printing.

Figure 4A:
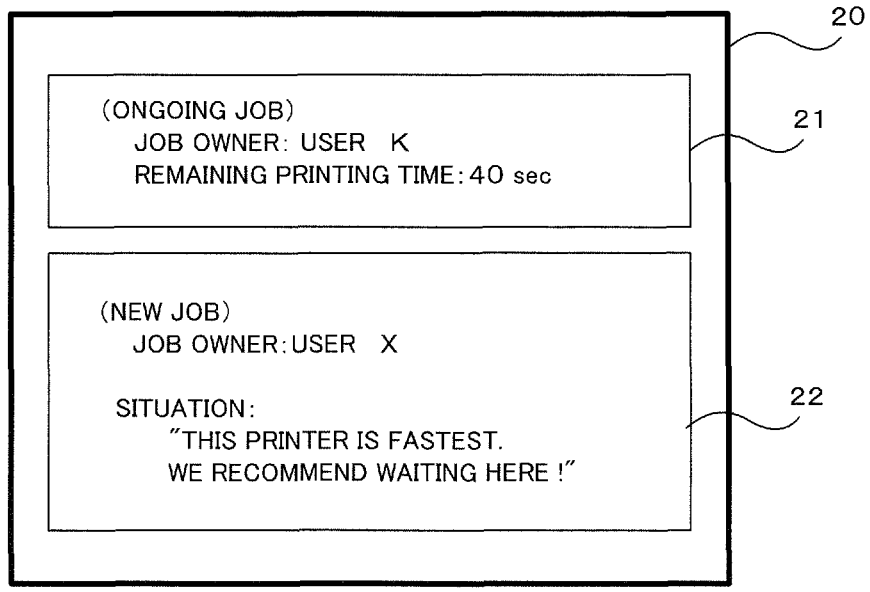
FIGS. 4A and 4B show examples of display screen in a printer.
Figure 4B:
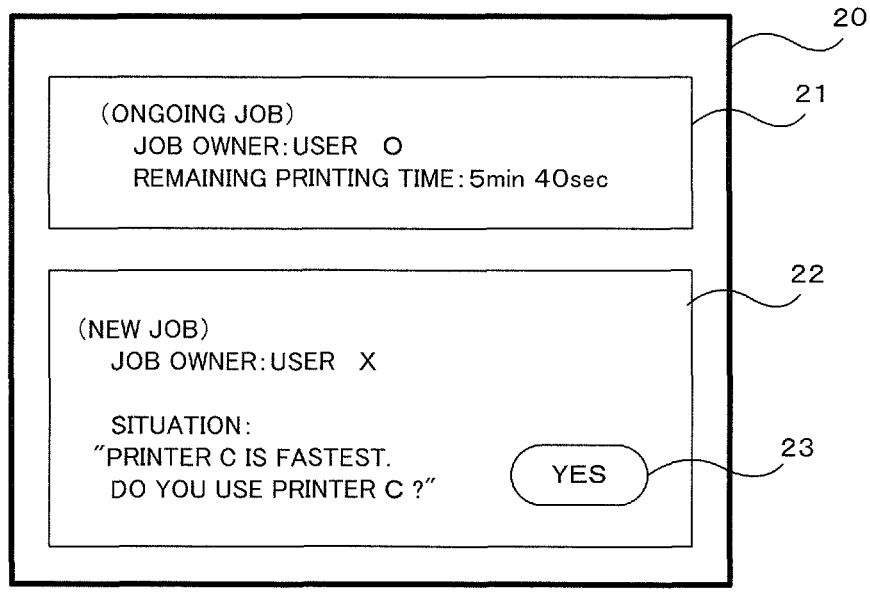

FIGS. 4A and 4B show example of the display notifying the user of the printer having the shortest waiting time. FIG. 4A is an example of the display screen of the printer A. The display screen 20 of the printer A includes a window 21 showing information of the job being executed at that time and a window 22 showing information of a new job instructed by newly putting the IC card. Here, the window 22 shows the information indicating which printer is fastest. The example of FIG. 4A shows the message indicating that the waiting time of the printer of the current position is shortest and proposing to wait there without moving to other printers.

FIG. 4B shows the example of the display on the printer B. In this example, the message is shown which indicates that the printer C located at another place has the shortest waiting time and moving to the printer C is proposed. It is noted that the printer which has the shortest waiting time and is recommended to use will be hereinafter referred to as "recommended printer". Further, the display screen of printer B shown in FIG. 4B includes a button 23 enabling the user to input an agreement on the proposal. If the user X agrees to move to the printer C and presses the button 23, the printer B transmits the user ID of the user X and the information indicating that the user X moves to the printer C to the print management server 5. The print management server 5 receives it, transmits the print job of the user X to the printer C and makes the printer C to execute the print job. If the printer C is executing another print job at that moment, the print management server 5 makes the printer C to reserve the print job of the user X as the print job to be executed next. In this way, the user can print the document with shortest time.

Figure 5:
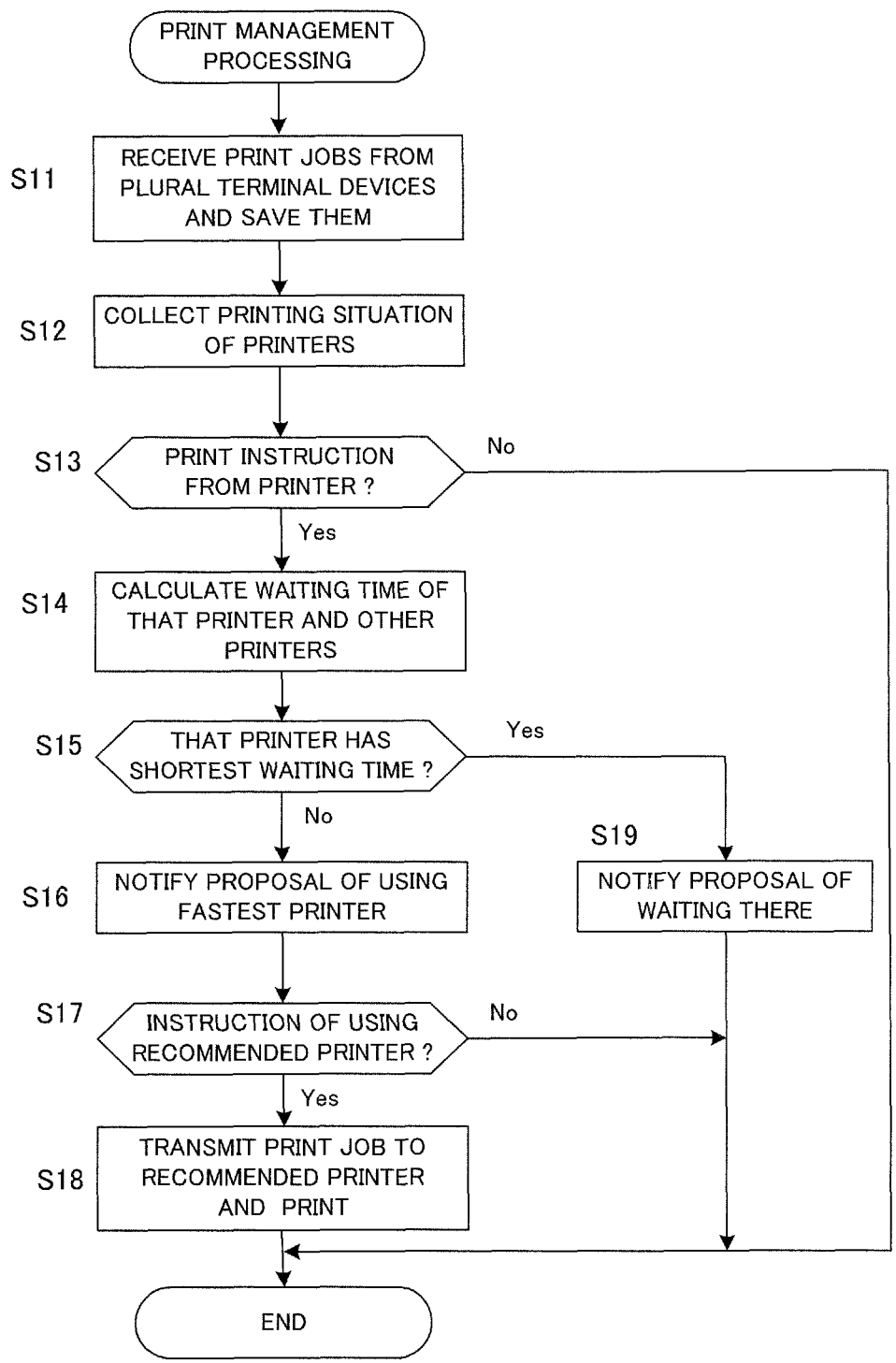
FIG. 5 is a flowchart of print management processing according to a first embodiment.

Next, the description will be given of the print management processing including the waiting time comparison processing described above. FIG. 5 is a flowchart of the print management processing according to a first embodiment. This processing is executed mainly by the print management server 5 which transmits and receives necessary information and instructions to and from each of the printers A to C. Specifically, this processing is executed by the print management server 5 which executes a program prepared in advance. This print management processing is repeatedly executed at every predetermined time period.

First, the print management server 5 receives the print jobs from the plural terminal devices 2 and saves them (step S11). The print management server 5 saves the received print jobs, and generates and updates the saved job information shown in FIG. 3A to manage the print jobs.

Next, the print management server 5 communicates with each of the printers A to C, and collects the current print execution status of each printer (step S12). Thus, the print management server 5 generates and updates the ongoing job information shown in FIG. 3B.

Next, the print management server 5 determines whether any one of the printers transmitted the print instruction (step S13). This print instruction is made by the user who has uploaded the print job to the print management server 5 from the terminal device 2, goes to the place of any one of the printers and puts his IC card to the printer. The printer to which the print instruction is made by the user transmits the user ID read out from the IC card and its own printer ID to the print management server 5.

If the print instruction is not transmitted from any one the printers (step S13; No), the processing ends. On the other hand, if the print instruction is transmitted from one of the printers (step S13; Yes), the print management server 5 calculates the waiting time of each of the printers as described above (step S14). Specifically, the print management server 5 adds the remaining printing time in the ongoing job information and the movement time in the movement time information to calculate the waiting time for each of the printers.

Next, the print management server 5 determines whether or not the printer to which the user has made the print instruction, i.e., the printer at the place where the user is present, has the shortest waiting time (step S15). If the waiting time of the printer is shortest (step S15; Yes), the print management server 5 notifies it to the printer, and makes the printer display the message proposing to wait at the place of the printer, like the example shown in FIG. 4A (step S19).

On the other hand, if the printer at the place where the user is present does not have the shortest waiting time (step S15; No), the print management server 5 notifies the printer of the printer having the shortest waiting time, and makes the printer at the place where the user is present display the message proposing to move to the printer having the shortest waiting time and also display the button 23 for inputting the agreement on the proposal, like the example shown in FIG. 4B (step S16).

Next, the print management server 5 inquires of the printer whether or not the user agreed on the proposal, i.e., whether or not the button 23 is pressed (step S17). If the user does not agree on the proposal (step S17; No), the processing ends. On the other hand, if the user agrees on the proposal and presses the button 23 (step S17; Yes), the print management server 5 transmits the print job to the recommended printer and makes the recommended printer execute the print job (step S18). Then, the processing ends.

As described above, according to the first embodiment, if the printer is already executing the print job when the user puts the IC card to the printer, the print management server 5 calculates the waiting time for each of the printers, and notifies the user of whether waiting at the printer is faster or moving to another printer is faster. Therefore, the user can quickly print the document without wasting the waiting time and movement time. In addition, in the first embodiment, when the user agrees on the proposal of using the recommended printer and input the instruction, the print job is transmitted to the recommended printer. Therefore, if the recommended printer is unoccupied, the printing is started during the movement of the user to the recommended printer. Thus, the user can advance the printing during his movement to the recommended printer and the time can be effectively used.

[2nd Embodiment]

In the first embodiment described above, when the user agrees on the proposal of moving to the recommended printer in step S17, the print management server 5 transmits the print job to the recommended printer to start the execution of the print job in step S18. Instead, in the second embodiment, the print management server 5 transmits the print job to the recommended printer in step S18, but does not make the recommended printer immediately start the printing. Namely, the print management server 5 reserves the print job in the recommended printer and sets the recommended printer to a reserved state. Except for the above feature, the second embodiment is the same as the first embodiment.

Here, the "reserved state" is the state in which the printer does not accept the print instruction even if another user goes to the printer and puts the IC card to the printer. When the user who has made the print instruction in step S13 goes to the recommended printer and puts the IC card, the recommended printer releases the reserved state and executes the reserved print job. By this, since the printing does not start unless the user who has actually made the print instruction goes to the recommended printer and puts the IC card, it is possible to avoid the printed matter left on the recommended printer and the information of the content of the printed matter can be protected.

However, if the user leaves the reserved state of the recommended printer and does not execute the printing by the recommended printer for a long time, it unfavorably prevents the use of the printer by another user for a long time. Therefore, the time for keeping the recommended printer in the reserved state may be limited, and the reserved state may be automatically released if a predetermined time has passed. Specifically, the print management server 5 may set the time for keeping the reserved state of the recommended printer based on the movement time information between the printers. For example, in case of proposing to use the printer C as the recommended printer to the user who has made the print instruction to the printer A, it is preferred that the print management server 5 sets the time for keeping the recommended printer in the reserved state to about twice or third times of the movement time from the printer A to the printer C (2 minutes 30 seconds in the example of FIG. 3C). In other words, if the user does not execute the printing after twice or third times of the standard movement time has passed, the reserved state is released.

[3rd Embodiment]

The third embodiment enables the methods of the first and second embodiments described above in a mixed manner in a single printing environment. As described above, when the user makes the print instruction by the terminal device 2, the user may execute the print job by another printer, which is different from the printer to which the user initially made the print instruction, because the waiting time is too long. In such a case, according to the first embodiment, the print management server 5 immediately transmits the print job to the recommended printer to execute the print job (hereinafter referred to as "immediate transfer"). On the other hand, according to the concept like the second embodiment, the print management server 5 sets the recommended printer to the reserved state, and transmits the print job to the recommended printer and executes the printing after the user puts the IC card to the recommended printer (hereinafter referred to as "reservation transfer").

In the third embodiment, the user can set to each of the print job whether the print job is to be processed by the immediate transfer or the reservation transfer. Specifically, when the user makes the print instruction by the terminal device 2, the user sets whether the print job is processed by the immediate transfer or the reservation transfer if the user needs to use the recommended printer. On receiving the setting by the user, the terminal device 2 attaches an identifier indicating the immediate transfer or the reservation transfer to the data of the print job and transmits the print job to the print management server 5. This identifier corresponds to the processing choice information of the present invention.

When the waiting time of the printer to which the user initially made the print instruction is long and the user chooses to use the recommended printer, the print management server 5 refers to the identifier attached to the print job. If the immediate transfer is chosen, the print management server 5 immediately transmits the print job to the recommended printer to execute printing. On the other hand, if the reservation transfer is chosen, the print management server 5 sets the recommended printer to the reserved state, and transmits the print job to the recommended printer and executes the printing when the user makes the print instruction to the recommended printer by putting the IC card. Thus, the user can choose one of the immediate transfer and the reservation transfer by himself when the user executes the printing by the printer different from the printer to which he initially instructed the printing.

Figure 6:
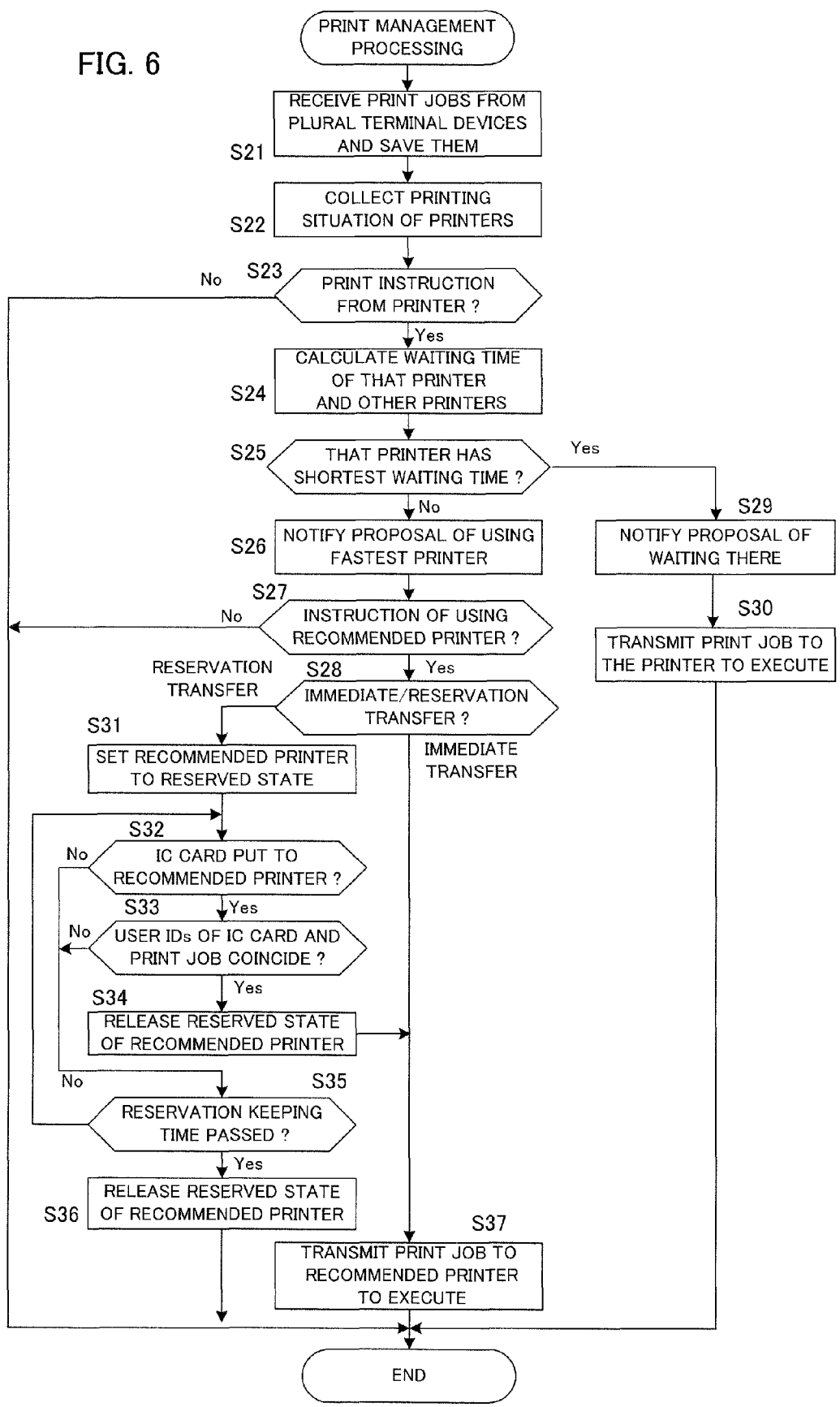
FIG. 6 is a flowchart of print management processing according to a third embodiment.

FIG. 6 is a flowchart of the print management processing according to the third embodiment. In FIG. 6, steps S21 to S27 are the same as steps S11 to S17 of the print management processing of the first embodiment shown in FIG. 5, and hence the description thereof will be omitted.

In step S25, if the printer at the place where the user is present has the shortest waiting time (step S25; Yes), the print management server 5 notifies it to the printer, and makes the printer display the message proposing to wait at the printer (step S29). Then, when the ongoing print job is finished, the print management server 5 transmits the print job of the user to the printer to execute the printing (step S30). Then, the processing ends.

If the user instructs the use of the recommended printer in step S27 (step S27; Yes), the print management server 5 refers to the identifier attached to the print job and determines whether the print job is set to the immediate transfer or the reservation transfer (step S28). If the print job is set to the immediate transfer, the print management server 5 immediately transmits the print job to the recommended printer to execute the printing (step S37). Then, the processing ends.

On the other hand, if the print job is set to the reservation transfer, the print management server 5 sets the recommended printer to the reserved state (step S31), and determines whether or not the user puts the IC card to the recommended printer (step S32). If the user puts the IC card to the recommended printer (step S32; Yes), the print management server 5 determines whether or not the user ID read from the IC card and the user ID of the print job coincide with each other (step S33). If the user IDs coincide (step S33; Yes), the print management server 5 releases the reserved state of the recommended printer (step S34), and transmits the print job to the recommended printer to execute the printing (step S37). Then, the processing ends.

On the other hand, if the IC card is not put to the recommended printer (step S32; No), or if the user IC read from the IC card and the user ID of the print job do not coincide (step S33; No), the print management server 5 determines whether or not the time for keeping the reserved state (hereinafter referred to as "reservation keeping time") determined in advance has passed (step S35). If the reservation keeping time has not passed (step S35; No), the processing returns to step S32. On the other hand, if the reservation keeping time has passed (step S35; Yes), the print management server 5 releases the reserved state of the recommended printer (step S36), and ends the processing.

In the third embodiment described above, the print management server 5 does not transmit the print job to the recommended printer when it sets the recommended printer to the reserved state, and transmits the print job to the recommended printer after the user puts the IC card to the recommended printer to make the printing instruction. Instead, the print management server 5 may transmit the print job at the same time when it sets the recommended printer to the reserved state. By this, the recommended printer can start the printing as soon as the user puts the IC card.

1st Modified Example

In the first embodiment described above, when the user agrees to move to the recommended printer in step S17, the print management server 5 transmits the print job to the recommended printer to start the execution of the print job in step S18. However, if the time necessary to execute the print job is short and the time necessary for the user to move to the recommended print is long, the printed matter is left on the recommended printer for a long time, and it is not undesirable in view of security. Therefore, the print management server 5 may control the print start time by the recommended printer in consideration of the time necessary for the user to move to the recommended printer so that the printed matter is left on the printer for as short time as possible. For example, if the print job will be finished by 2 minutes from the present time and the user needs 3 minutes to move to the recommended printer, the recommended printer is controlled to start the printing after 1 minutes passed from the present time. Thus, the printing by the recommended printer will be finished almost at the same time as the user reaches the recommended printer, and the printed matter is left on the printer for as short time as possible.

2nd Modified Example

In the above embodiments, the print management server 5 stores the printing speed of each of the printers in advance, and calculates the total printing time based on the printing speed and the data amount of each of the print jobs. Instead, the total printing time may be calculated by each of the printers. As described above, the print management server 5 periodically collects the ongoing job information from each of the printers. At the same time, each of the printers may calculate the total printing time of the print job being currently executed and transmit it to the print management server 5. If there is a reserved print job, each of the printers also calculates the total printing time of the reserved print job and transmits it to the print management server 5. The print management server 5 saves the total printing time received from each of the printers in the ongoing job information as shown in FIG. 3B.

3rd Modified Example

In the above embodiments, as shown in FIG. 2, the print management server 5 is configured as a server independent from the terminal devices 2 and the printers. Instead, the function of the print management server 5 may be provided inside any one of the printers or inside any one of the terminal devices 2. Namely, according to the present invention, if a plurality of terminal devices 2, a plurality of printers and a unit having the function of the print management server 5 are provided on the network, the processing like the embodiments described above may be executed regardless of the position where the unit having the function of the print management server 5 is provided.

4th Modified Example

In the above embodiments, the print management server 5 determines whether or not the user ID included in the print job and the user ID read from the IC card coincide, and transmits the print job to the printer if they coincide. However, in a case where the user IDs of different system are used for the user ID included in the print job and the user ID stored in the IC card, it is sufficient that they correspond to each other, even if they coincide with each other. In this case, the print management server 5 may store a correspondence table between the user ID included in the print job and the user ID stored in the IC card and determine that the user IDs correspond to each other by referring to the correspondence table.

For example, in a case where the user ID included in the print job is "User001" and the user ID stored in the IC card is "Card001", if the correspondence table stored in the print management server 5 indicates that "User001" and "Card001" belong to the same user, the print management server 5 may determine that those user IDs correspond to each other and execute the print job.

INDUSTRIAL APPLICABILITY

This invention can be used for a network including a plurality of printers.

DESCRIPTION OF REFERENCE NUMERALS

2 Terminal Device
5 Print Management Server
6 LAN
A-C Printer

The invention claimed is:

1. A print management device connected to a plurality of printers and a plurality of terminal devices comprising:
a print job saving unit which receives print lobs from the plurality of terminal devices and saves the print jobs;
a print status management unit which. manages print execution status of each of the plurality of printers; and
a print control unit which obtains, when receiving a print instruction from one of the plurality of printers, the print job corresponding to the print instruction from the print job saving unit and transmits the print job to a sender printer which has transmitted the print instruction to make the sender printer execute the print job,
wherein, when the sender printer is executing other print job, the print control unit calculates a waiting time of each of the plurality of printers based on the print execution, status of each of the plurality of printers and time necessary to move between the plurality of printers, and notifies the sender printer of the printer having a shortest waiting time.

2. The print management device according to claim 1, wherein, when the sender printer is executing the other print job, the print control unit determines a faster method from a first method of using the sender printer after waiting for a finish of the other print job and a second method of using a recommended printer having a shortest waiting time among other printers after moving to the recommended printer, and notifies the sender printer of the faster method.

3. The print management device according to claim 2, wherein, when the print control unit determines that the second method is faster and a user instructs to use the recommended printer, the print control unit transmits the print job corresponding to the print. instruction to the recommended printer to make the recommended printer execute the print lob.

4. The print management device according to claim 2, wherein, when the print control unit determines that the second method is faster and a user instructs to use the recommended printer, the print control unit sets the recommended printer to a reserved state and invalidates other print instructions to the recommended printer.

5. The print management device according to claim 2, wherein, the print lob includes processing choice information specifying which one of to first processing and a second processing is to be executed when the recommended printer is used, the first processing immediately transmitting the print job corresponding to the print instruction to the recommended printer to execute the print job, the second processing setting the recommended printer to a reserved state and invalidating other print instructions to the recommended printer, and wherein, when the print, control unit determines that the second method is faster and a user instructs to use the recommended printer, the print control unit executes one of the first processing and the second processing specified by the processing choice information.

6. The print management device according to claim 4, wherein, when the print control unit receives the print instruction transmitted from the recommended printer and made by the user who has made the print instruction to the sender printer, the print control unit releases the reserved state of the recommended printer and makes the recommended printer execute the print job corresponding to the print instruction.

7. The print management device according to claim 4, wherein the print control unit releases the reserved state of the recommended printer, if a predetermined time has passed after setting the recommended. printer to the reserved state but the print control unit does not receive, the print instruction transmitted from the recommended printer and made by the user who has made the print instruction to the sender printer.

8. The print management device according to claim 1, wherein the print job includes an identification information of the user who has transmitted the print, job, wherein the print instruction includes the identification information of the user who has transmitted the print instruction, and wherein the print control unit obtains the corresponding print on from the print, job saving unit based on the identification information of the user included in the received print instruction. print 9. The print management device according to claim 8, wherein each of the plurality of printers includes:

a reading unit which reads the identification information of the user from a storage medium possessed by the user; and a transmitting unit which transmits the identification information of the used read from the storage medium in a manner included in the print instruction.

10. A print management program in a non-transient computer-readable medium, executed by a print management device connected to a plurality of printers and a plurality of terminal devices and including a computer, the program making the computer function as:

a print job saving unit which. receives print jobs from the plurality of terminal devices and saves the print jobs;

a print status management unit which manages print execution status of each of the plurality of printers; and a print control unit which obtains, when receiving a print instruction from one of the plurality of printers, the print job corresponding to the print instruction from the print, job saving unit and transmits the print job to a. sender printer which has transmitted the print instruction to make the sender printer execute the print job, wherein, when the sender printer is executing other print lob, the print control unit calculates a waiting time of each of the plurality of printers based on the print execution status of each of the plurality of printers and time necessary to move between the plurality of printers, and not the sender printer of the having a shortest waiting time.

* * * * *